United States Patent [19]

Langdon et al.

[11] 3,829,842
[45] Aug. 13, 1974

[54] AUTOMATIC SELF-TESTING PROGRAMMABLE INDUSTRIAL CONTROLLER

[75] Inventors: David H. Langdon, Enfield; James C. Prentice, Bolton; David L. Van Olinda, Somers, all of Conn.

[73] Assignee: Terry Controls Corporation, South Windsor, Conn.

[22] Filed: Feb. 22, 1973

[21] Appl. No.: 334,777

[52] U.S. Cl....... 340/172.5, 235/151.1, 235/151.11, 235/153 AC, 235/153 AK
[51] Int. Cl..... G05b 11/00, G06f 1/00, G06f 11/00
[58] Field of Search . 340/172.5; 235/151.1, 151.11, 235/153 AC, 153 AK

[56] References Cited
UNITED STATES PATENTS

| | | | |
|---|---|---|---|
| 3,651,477 | 3/1972 | Barlett et al. | 340/172.5 |
| 3,686,639 | 8/1972 | Fletcher et al. | 340/172.5 |
| 3,701,113 | 10/1972 | Chace et al. | 340/172.5 |
| 3,719,931 | 3/1973 | Schroeder | 340/172.5 |
| 3,731,280 | 5/1973 | Shevlin | 340/172.5 |
| 3,753,243 | 8/1973 | Ricketts, Jr. et al. | 340/172.5 |

OTHER PUBLICATIONS

PD-.II Solid State Programmable Controller; Allen–Bradley Co. Bulletin 1760, September 1970.
G. Lapidus, "Programmable Logic Controllers —Painless Programming to Replace the Relay Bank" in Control Engineering, April 1971; pp. 49–60.
1750 Programmalbe Matrix Controller; Allen–Bradley Co. Publication SD 23; August 1972.
N. Andreiev, Programmable Logic Controllers—An Update" in Control Engineering September 1972, pp. 45–47.
Struthers–Dunn Variable Industrial Programmer, Data Bulletin 2900 Series 72 Rev. 6–72, June 1972.
Industrial Solid State Controls Inc. IPC Industrial Programmable Controller, January 1973.
Square D Co. Program Sequence Controller, SM 452 KCC November 1972.
"PDP-14 and PDP-14/L Programmable Controller" in 1971 Digital Control Handbook September 1970, pp. 361–379.

*Primary Examiner*—Paul J. Henon
*Assistant Examiner*—Melvin B. Chapnick

[57] ABSTRACT

A programmable industrial logic controller is provided for accomplishing the sequencing operations and other related control tasks performed by a logic control system of the type adapted for controlling machine and process equipment. The controller includes input means, memory means, control logic means, automatic self-test means, output means and manual test means. The input means functions to receive inputs supplied to the controller corresponding to the existing conditions of a plurality of parameters of the equipment being controlled. A pre-established set of instructions is stored in the memory means relating to the operation of the equipment being controlled. The control logic means functions to operate in response to a set of instructions stored in the memory means. Further, the control logic means functions to generate outputs, for controlling the operation of the equipment, from the series of instructions extracted from the memory means. Automatic self-test means are provided for periodically performing a self test of the controller to determine whether the controller is functioning properly. The output means is connected in circuit relation with control logic means and receives therefrom the outputs generated thereby. The outputs received by the output means are supplied thereby to the equipment being controlled. The manual test means are provided to permit manual test of selected controller functions.

18 Claims, 8 Drawing Figures

AUTOMATIC SELF-TESTING PROGRAMMABLE INDUSTRIAL CONTROLLER

BACKGROUND OF THE INVENTION

It has long been known how to employ electromechanical relays and timers in control systems for effectuating the automated or unattended operation of machines and equipment. In accordance with conventional practice, such relays and timers are required to operate in a controlled sequence, as a series of predetermined conditions occur. System control requirements, which comprise the control logic for the system, are determined by the sequence of operation and specific conditions that must occur during equipment operation, such as command functions, pilot functions and timing functions. As machine and equipment operations change during the operating sequence, system control requirements, i.e., control logic must also change in response to each new command, pilot or timing signal received during the sequence operation.

The intelligence, or control logic, of a relay system is contained in the point-to-point wiring arrangement of relays for each specific application or piece of control equipment. This gives rise to a major disadvantage of relay systems which is that when system control requirements change, the relay system must be rewired to provide the change in control logic. This requires costly time to be expended on the part of engineering, production, or field service organizations.

Another disadvantage inherent in the use of relay control systems is that the moving parts which are embodied in the electrical and mechanical components thereof are subject to wear and/or failure as a result of sustained operation thereof. Commonly, in order to provide the necessary repair or replacement of the malfunctioning component, the equipment being controlled by the relay system must be shut down. This downtime of the equipment results in a loss of production, and thereby represents an increased cost of manufacture. Obviously therefore, it is important in order to achieve economics of manufacture that the frequency and duration of such periods of downtime be minimized to the fullest possible extent.

In an effort to obviate the aforedescribed disadvantages as well as to take advantage of some of the inherent desirable characteristics of solid state components, attention has been directed in recent years to the development of what has most commonly been referred to in the art as a "programmable controller." The latter term is generally employed to refer to a logic control device embodying solid state components, which is designed to continuously scan inputs such as limit switches, pressure switches and other pilot or signal devices, comparing inputs to the conditions specified in a programmed memory. The programmed memory contains the control logic, i.e., intelligence of the programmed controller and constitutes a solid state method of performing a YES or NO decision to accomplish control functions as the necessary operating conditions occur. As the controller scans memory, it extracts a series of instructions, i.e., logic therefrom that control the solutions to output functions, energizing or de-energizing valves, starters, etc., as instructed by the programmed memory. This solid state technique permits functional plug-in modules to be identical among installations, with only memory changes required to meet new logic requirements. Logic changes are made simply by changing or adding to the programmed memory contained on a plug-in module, eliminating the custom wiring and costly downtime for modifications common to relay systems. In addition, since the solid state components embodied in the programmable controller do not have any moving parts which are susceptible to wear, the operating life of these components is greatly extended beyond that which one is accustomed to obtaining from the electro-mechanical components of a conventional relay control system. A further desirable characteristic of programmable controllers resides in their inherent speed of operation which enables an increase in production to be achieved through the use thereof.

Notwithstanding the fact that the above referenced advantageous features possessed by programmable controllers are recognizable and accepted by potential users of this type of device, the acceptibility of programmable controllers has not yet measured up to its full potential. One reason for this is that accompanying the substitution of solid state hardware for traditional relay control systems comes the problem and fear factor of user personnel being unable to maintain the equipment. This element of concern reduces to the inherent NO-HEAR NO-SEE operation of electronic circuitry. In contradistinction to electro-mechanical relay control systems, a user's natural senses cannot help him analyze a problem in a solid state programmable controller when he cannot hear or see what is happening. The electronic technician has the very same problem, except he has been taught to use voltmeters and oscilloscopes and other specialized instruments to "bring to life" his electronic problem. In the case of programmable controllers, however, as a practical matter such instrumentation methods are not readily feasible for use to aid the user to understand his problem. There is a need to provide a programmable controller with means operable to permit the user to "see" how the equipment is performing and to test it as a unit. If portions of the system are inoperative the user must be readily able to identify the faulty component and replace it. Heretodate, however, the programmable controllers which have been made available have been found to be lacking in this regard.

Another area in which prior art forms of programmable controllers have been found to be deficient is in their ability to permit the simple incorporation of field changes in their programmed memory. In this regard, many prior art forms of programmable controllers require, when making changes in their program, that a rigorous program format be followed wherein all logic conditions of one output must be completed before moving to the next output. More specifically, there is a need to provide logic processing means which is operable in such a manner that, if the changes sought to be implemented by the user should require that the standard logic be altered, the new logic can be added at the end of memory and only the obsolete memory need be erased from the standard memory. Thus, the problem of complete rejuggling of the memory program to fit the new logic into the proper place and completely replacing all affected modules is thereby eliminated. This invention permits random programming of the memory.

Accordingly, it is an object of the present invention to provide a novel and improved programmable industrial logic controller embodying highly reliable electronic components which eliminate the need for custom wiring arrangements and insure reliability in a system control environment. It is also an object of the present invention to provide such a programmable industrial logic controller embodying means for continuously checking circuit performance and for readily providing identification of malfunctioning components whereby to facilitate maintainability of the controller.

Another object of the present invention is to provide such a programmable industrial logic controller which embodies means operable to provide direct solutions to most control problems ranging from routine to complex control requirements and which enables field changes required as control operations change to be easily incorporated therein, thereby providing a controller having a high degree of system flexibility.

Still another object of the present invention is to provide such a programmable industrial logic controller which utilizes memory modules that are capable of being expanded to meet changes in system demands, and which is adapted to have associated therewith a variety of different types of components to meet the wide range of system requirements, thereby providing a controller possessing a high degree of system compatibility.

It has now been found that the foregoing and related objects can be readily attained in a programmable industrial logic controller which is capable of accomplishing the sequencing operations and other related control tasks performed by a logic control system of the type adapted for controlling machines and process equipment. The controller includes input means, the function of which is to receive inputs supplied to the controller corresponding to the existing conditions of a plurality of parameters of the equipment being controlled. The controller has memory means in which a pre-established set of instructions is stored relating to the operation of the equipment being controlled. In addition, a controller is provided with control logic means which functions to operate in response to a set of instructions stored in the memory means. Further, the control logic means functions to generate outputs, for controlling the operation of the equipment, from the series of instructions extracted from the memory means.

Automatic self-test means are provided in the controller for periodically performing a self-test of the controller to determine whether the controller is functioning properly. The controller also includes an output means which is connected in circuit relation with the control logic means and receives therefrom the outputs generated thereby. The outputs received by the output means are in turn supplied thereby to the equipment being controlled.

In accordance with the preferred embodiment of the invention, a programmable industrial logic controller has been provided which is capable of controlling a plurality of outputs as a function of a plurality of inputs. The relationships between inputs and outputs can be expressed by logic statements, diagrams, equations, etc. The solutions to the latter represent step-by-step solutions to these interrelating equations and expressions. The basic functional components of this controller consist of a memory, a memory address, an instruction decoder, a logic processor, an input-output multiplexer, a self-test means, a built-in test means, and timer means. The memory stores a series of digitally coded instructions representing the solutions to a set of equations describing the control system requirements for a particular application. The memory address provides a means of addressing a particular memory location to extract a desired memory instruction. The instruction decoder decodes and converts memory instructions into electrical signals which control the operation of the various control circuits involved in solving the programmed equations. The logic processor receives the status of selected inputs and outputs and operates on these inputs and outputs in response to instructions received from the instruction decoder, solving the equations stored in memory which represent the solutions to system outputs. The input-output multiplexer provides a means of interrogating the status of input/output conditions and for storing output solutions provided by the logic processor. The self-test means provides an automatic test of various control circuits in response to a series of instructions stored in memory and provides a visual fault indication identifying circuit elements which fail their respective tests. The built-in test means provides a means of displaying memory contents via a set of manual control switches which are interlocked with output circuits to prevent accidental and undesired energization of output loads during test. The timer means is operable to provide adjustable time delays in response to programmed memory instructions.

DETAILED DESCRIPTION OF THE ILLUSTRATED EMBODIMENT

Figure 1:
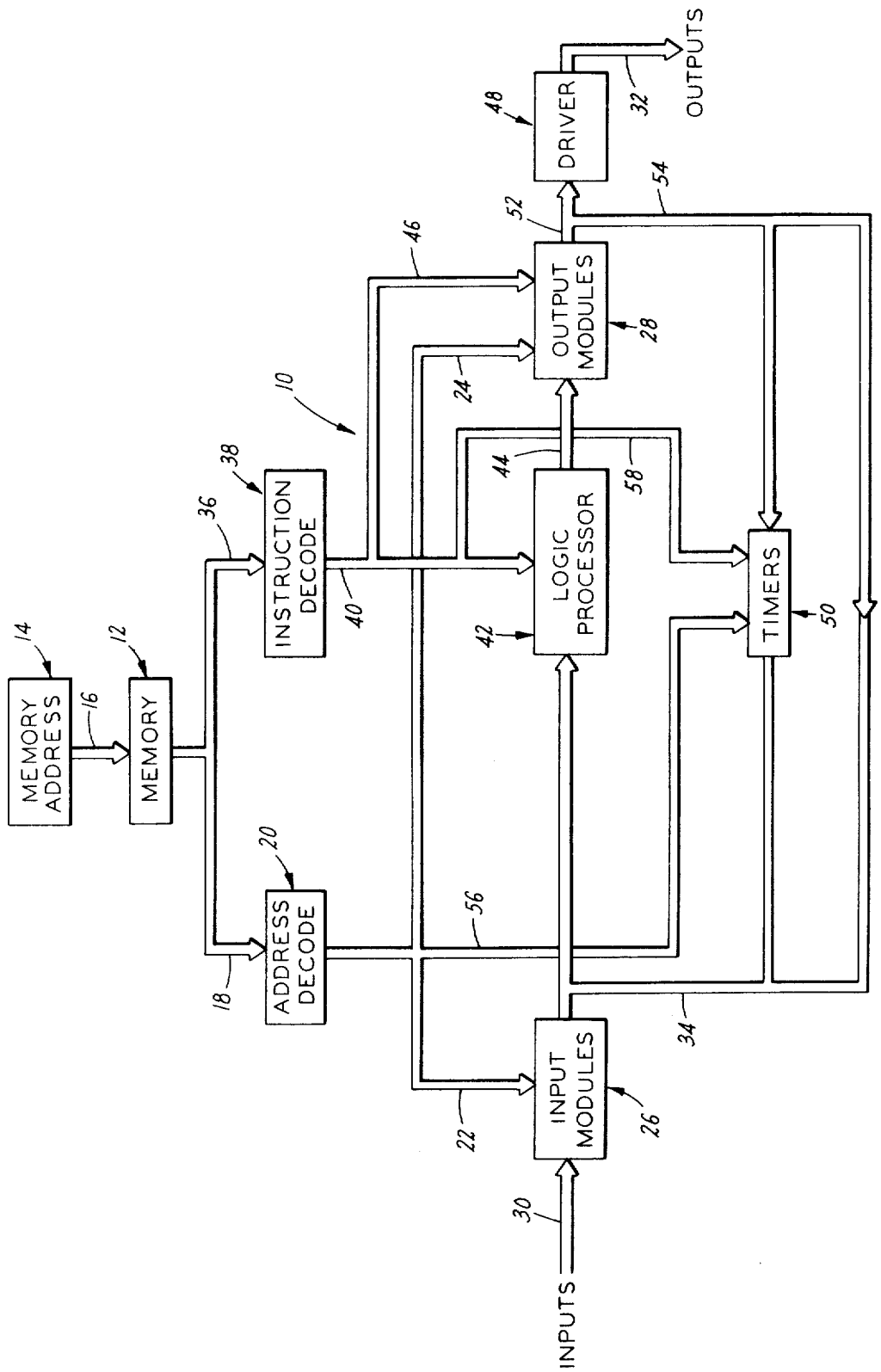
FIG. 1 is simplified block diagram of a programmable industrial logic controller constructed in accordance with the present invention, illustrating the basic functional control components of the controller and a flow of information between these components.

Referring now to FIG. 1 of the drawings, there is illustrated therein in block diagram form the basic functional components and the manner in which information flows therebetween of a programmable industrial logic controller, generally designated by reference numeral 10, constructed in accordance with the present invention. One specific application for which the controller 10 has been found to be particularly suited for employment is for purposes of providing the automatic control of gas turbine engines and associated equipment used with them in industrial applications. When so employed, the controller 10 is required to have the capability to accept all of the various input signals from operator commands, parameter sensing devices and other auxiliary equipment and provide the proper control output signals to the turbine engine and its associated equipment. The output control signals accomplish the multitude of functions required to automatically start the turbine system, monitor its proper acceleration and normal running, automatically sequence normal shutdown operation and provide automatic alarm and emergency control if malfunctions occur.

The basic operating principle of the controller 10 is to continuously scan through memory extracting a series of instructions which represent step-by-step solutions to equations which define the output logic. The operations performed by the controller 10 in the process of examining inputs, solving equations and storing output solutions are controlled by a method referred to as "clocking." "Clocking" refers to the technique of providing a high frequency pulse train of electrical pulses from a master clock to control the sequence and the precise timing of events within the controller 10.

The manner in which the controller 10 functions can best be understood with reference to the block diagram of FIG. 1 of the drawings. Referring thereto, pulses derived from the master clock control memory scan. As the memory 12 is scanned its contents are extracted, i.e., READ, as a series of instructions which control the step-by-step solutions to the output equations and also control the circuit-by-circuit self-test of the controller 10. The memory address 14 provides a means of addressing through bus 16 a particular memory location to extract a desired memory instruction.

Each memory word consists of two parts, an input-/output address and an instruction. The address identifies inputs and outputs and the instruction defines a particular operation to be performed in relation to the input or output addressed. The address part of each word is fed by means of bus 18 to an address decoder 20 which energizes discrete lines 22, 24 of an address bus corresponding to the coded memory address word. These lines 22, 24 select the rack, card and circuit on the cards of the input modules 26 or the output modules 28, corresponding to the input or output addressed. Input modules 26 may receive inputs 30 from a variety of different types of control devices (not shown) such as control switches, limit switches, pressure switches, speed switches, etc. Further, the output modules 28 are adapted to provide the output signals therefrom to different forms of controllable devices (not shown) such as valves, heaters, lights, exciters, etc. The status, i.e., ON or OFF of the particular input or output addressed is then fed to an input bus 34.

The same memory word contains an instruction code which is fed by bus 36 to an instruction decoder 38. The instruction decoder 38 decodes the memory instruction and issues commands by means of bus 40 to the logic processor 42 in the form of pulses derived from the master clock, which control the sequence of operations performed by the logic processor 42. The logic processor 42 is the functional element which performs the actual solution of the output logic equations. The ON/OFF solutions generated by the logic processor 42 are available on an output bus 44 which feeds all of the output cards embodied in the output modules 28. To store a solution on a particular output card, the memory word following examination of the last term of an equation addresses the corresponding output and issues an instruction which results in the instruction decoder 38 providing a store pulse. The output addressed then stores the ON or OFF solution existing on the output bus 44 when the store pulse is issued.

At the end of a complete scan, after all of the output equations have been solved and the ON/OFF solutions stored on the output cards of output modules 28, an EXECUTE instruction is read out of memory 12, fed by bus 36 to the instruction decoder 38 where it is decoded and transmitted therefrom by instruction bus 46 to the output modules 28. The EXECUTE instruction causes the simultaneous transfer of each of the aforedescribed solutions to a second storage element of output modules 28 which controls output driver 48 and timers 50 through bus 52 and bus 54, respectively. The driver 48 provides the interface between the output modules 28 and the controllable devices (not shown) by providing outputs 32 to the latter which are being controlled by the outputs provided from modules 28. The timers 50 provide a means of providing time delays. More particularly, time delays are provided by programming the timer equation in memory 12, solving the timer equation the same as any output equation, storing the solution on an output card and using the output from an output card of output modules 28 to energize and deenergize the timers 50. To utilize the timers 50 in another output equation, the timers 50 are simply addressed by memory 12 to interrogate their state by means of address decoders 20, bus 56, and instruction decoder 38 and bus 58.

A new scan is initiated by a RECYCLE instruction read from memory 12 followed by a CLEAR instruction which resets the logic processor 42 and clears the output cards of output modules 28 to accept a new series of output solutions. The storage elements of output modules 28 controlling the output driver 48 are not influenced by the CLEAR instruction thereby retaining the previous output state until the next EXECUTE instruction updates its status. The mode of operation of controller 10, as described in the preceding paragraphs, is then repeated.

Figure 2:
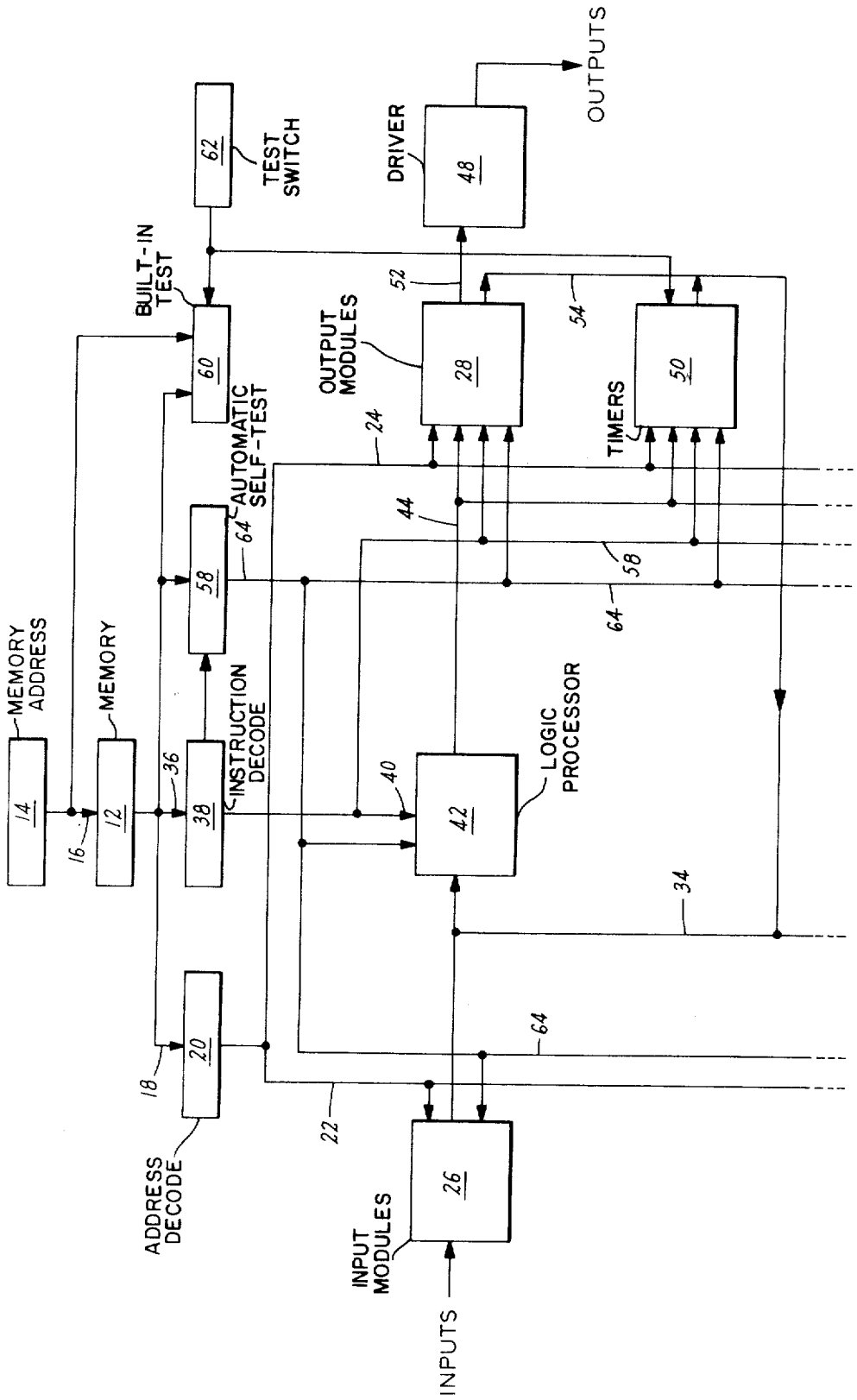
FIG. 2 is a block diagram of a programmable industrial logic controller constructed in accordance with the present invention, illustrating the basic functional control components as well as the automatic self-test means and the manual built-in test means thereof, and the flow of information therebetween.

Turning now to FIG. 2 of the drawings, there is illustrated therein in block diagram form a programmable industrial logic controller 10, constructed in accordance with the present invention, embodying the basic functional components depicted in the block diagram of FIG. 1 and described hereinabove, as well as automatic self-test means 58, manual built-in test means 60, and a test enabling switch 62. These latter components, as will be described more fully subsequently provide the controller 10 with a dual test capability. More particularly, the self-test capability of the controller 10 falls into two basic categories, i.e., sequential test of input and output cards performed automatically once per memory scan based on a diagnostic test program contained in memory 12, and a continual self-test of the central process unit, the latter comprising the memory address 14, the decoders 20 and 38, the logic processor 42, the self-test means 58 and the built-in test means 60, and memory cards utilizing built-in test features on each individual card. In connection with the above, it is believed that it will suffice at this time to merely note that in accordance with the mode of operation of the controller 10, a fraction of each memory scan cycle is reserved for the automatic self-test of the controller 10. During this part of the cycle, the outputs are "frozen" and a test is performed on each card in the circuit to determine if it is operating properly. For this prupose as shown in FIG. 2, automatic self-test means 58 is connected by means of test bus 64 in circuit relation to each of the basic functional components embodied in the block diagram of FIG. 1. Failure of a circuit to respond properly to the test immediately after a start is attempted results in appropriate alarms and lockouts, which in the case of a gas turbine, could be used to prevent a start. Critical circuits are continuously tested throughout operation and are provided with suitable TRIP and ALARM outputs which are operable to readily identify a failure in the controller 10 which could result in damage to the control system.

For purposes of more clearly emphasizing the fact that the controller 10 is commonly provided with a plurality of input modules 26, output modules 28, and timers 50, in the block diagram of FIG. 2 each of the modules 26, 28 and 50 is intended to represent only one input module, one output module, and one timer, respectively. The other input modules, output modules, and timers (not shown) are connectable to the ends of the buses depicted in dotted lines in FIG. 2. More specifically, such other input modules (not shown) are connected to the bus 22 and the bus 64. In addition, the other input modules, output modules and timers (not shown) are connected by means of bus 34 to the logic processor 42. Finally, the other output modules and timers (not shown) would also be connected to the buses 24, 44, 59 and 64.

Figure 3:
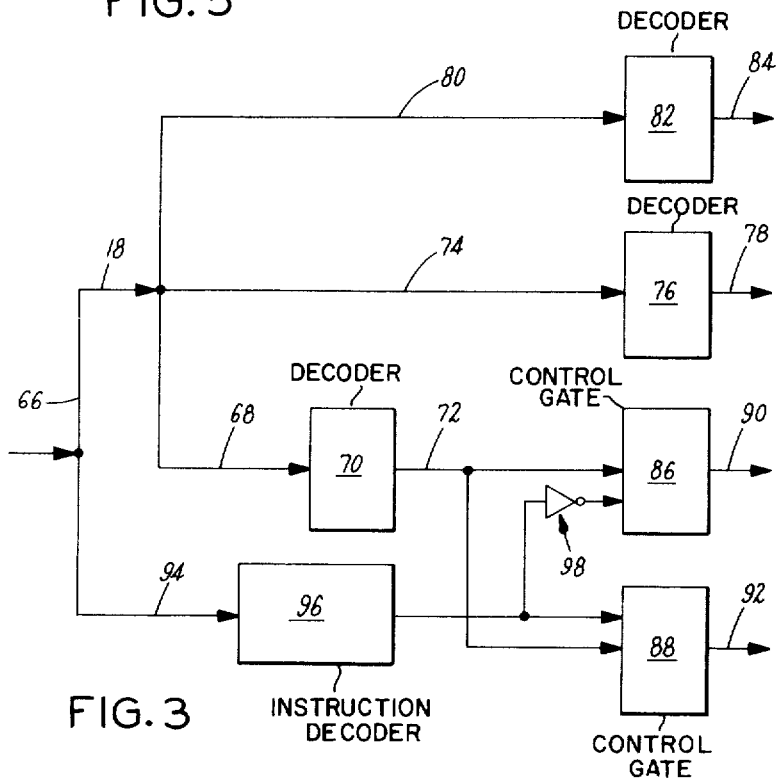
FIG. 3 is a block diagram of input/output addressing portion of a programmable industrial logic controller constructed in accordance with the present invention, illustrating the mode of operation thereof wherein the input/output capability of the controller is expandable.

Referring now to FIG. 3 of the drawings, there is illustrated therein the input/output address portion of the controller 10. As noted previously, the basic operating principle of the controller 10 is to scan inputs and outputs in response to instructions read out of memory 12 and to compare the state, i.e., ON or OFF of the inputs 30 and outputs 32 to conditions stored in memory which represent solutions to the output equations. This type of operation requires an addressing scheme to multiplex inputs and outputs on to a common input bus which is fed to a central logic processor 42 for comparison with the programmed conditions in memory 12.

In accordance with the preferred embodiment of the controller 10, the latter has a total capacity of 512 inputs and outputs with an additional 512 auxiliary outputs, providing a maximum capacity of 1,024 inputs and outputs. Inputs and outputs are packaged 8 per card, 16 cards per rack, and 8 racks per controller thus providing the full 1,024 input/output capacity of the controller 10. Turning next to a description of the manner in which the input/output portion of controller 10 as depicted in FIG. 3 of the drawings operates, a 12 bit memory word is fed thereto from memory 12 by means of bus 66. Nine of the 12 memory word bits are reserved for input/output address and are provided thereto by means of bus 18. The first two of these 9 bits are fed by means of bus 68 to a decoder 70 wherein they are decoded into one of four rack select outputs 72, only one of the latter being depicted in FIG. 3. The next 4 bits are fed by bus 74 to a decoder 76 wherein they are decoded into 16 card select outputs, only one of which 78 is depicted in FIG. 3. The remaining three bits are fed by bus 80 to a decoder 82 wherein they are decoded into eight input/output select outputs only one of which 84 is shown in FIG. 3. Thus it can be seen with reference to FIG. 3 that the aforedescribed nine bits are capable of providing 512 distinct input/output addresses. More particularly, these 9 bits provide a means of addressing any particular input or output on a particular card of a particular rack.

To extend the capacity to 1,024, providing an additional 512 auxiliary outputs, each of the four rack select outputs 72 is gated by means of either control gate 86 or control gate 88 on to one of two rack select buses, a normal rack select bus 90 or an auxiliary rack select bus 92. Gating is controlled as a function of memory instruction. In this connection, the remaining three bits of the 12 bit memory word fed from the memory 12 provide the aforementioned memory instruction. These 3 bits are fed by a bus 94 to an instruction decoder 96 wherein they are decoded. If a "STORE AUXILIARY" instruction is issued together with an address, this instruction is decoded by decoder 96 and will result in the energization of one of the auxiliary rack select buses 92. An inhibit means 98 is connected in circuit relation with the decoder 96 whereby to preclude energization of one of the four normal buses 90 when a "STORE AUXILIARY" instruction is issued. Any other instruction code will result in one of the normal rack elect buses 90 being energized. This limits the use of the auxiliary address codes to outputs which do not have to be examined in the course of solving any other logic expression since information can only be stored in auxiliary outputs for the purpose of driving loads and cannot be interrogated.

Figure 4:
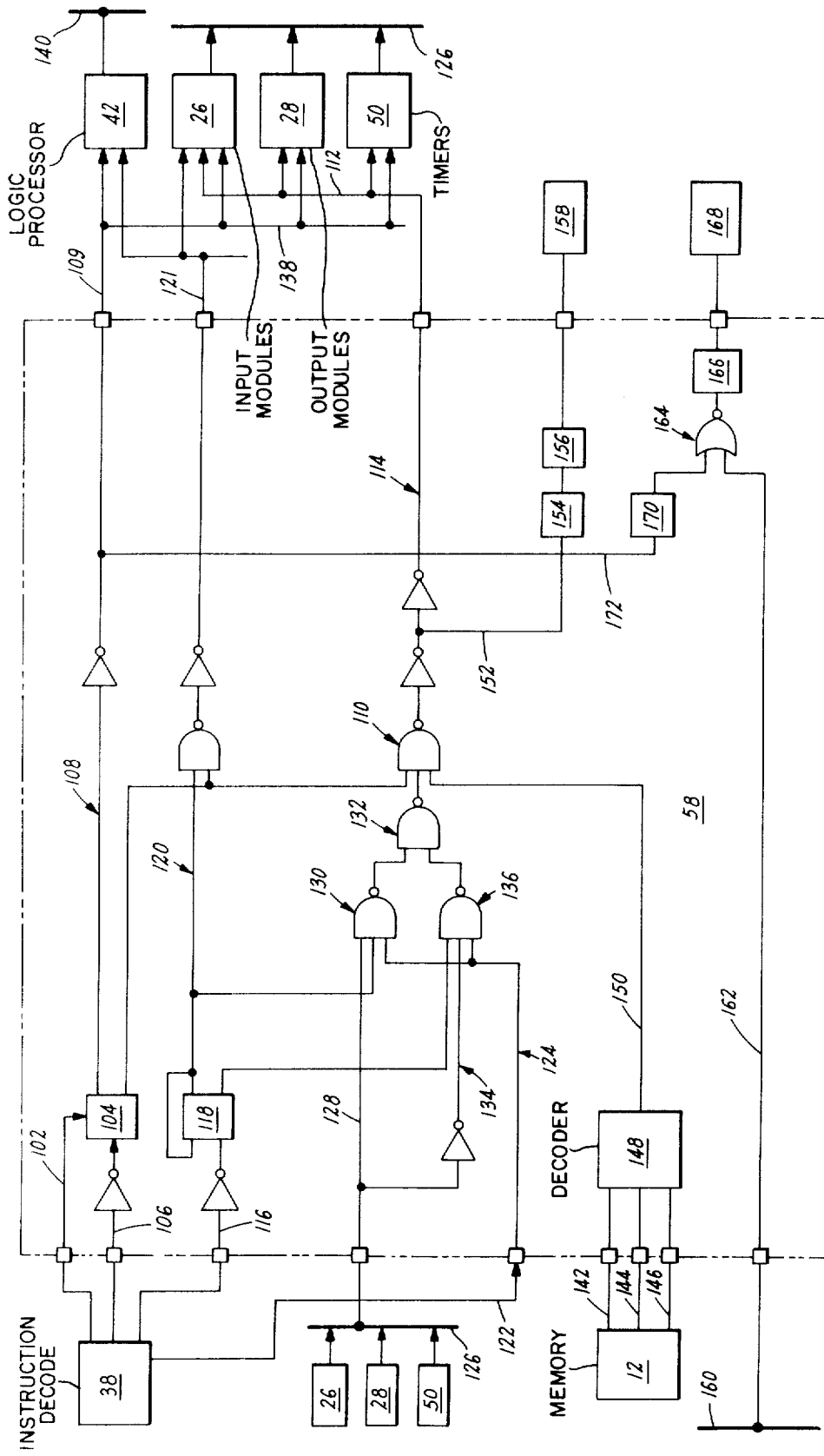
FIG. 4 is a schematic circuit diagram of the automatic self-test module of a programmable industrial logic controller constructed in accordance with the present invention, illustrating the circuitry thereof as well as the manner in which the self-test module is connected in circuit relation with other components of the controller.

In FIG. 4 of the drawings, there has been depicted the self-test means, generally designated therein by reference numeral 58, of the controller 10. The various operating components comprising the self-test means 58 are schematically illustrated in the dotted line enclosure 100 depicted in FIG. 4. The components appearing in FIG. 4 externally of dotted line enclosure 100 are illustrated for purposes of showing the manner in which self-test means 58 is associated in circuit relation with some of the basic functional components of controller 10. The primary function of self-test means 58 is to provide an automatic test of various control circuits in response to a series of instructions stored in memory 12. In addition, the self-test means 58 is operable to provide a visual fault indication identifying circuit elements which fail their respective test.

There will now be set forth a general description of the components of controller 10 shown in FIG. 4 of the drawings as well as a description of the mode of operation of these components. The instruction decoder 38, previously referred to hereinabove, has been depicted in the upper left-hand portion of FIG. 4. It is, of course, understood that although not shown in FIG. 4, the instruction decoder 38 receives coded instruction inputs from the memory 12. These instruction inputs are decoded by the instruction decoder 38 into outputs which are in the form of four individual pulse trains. One of these pulse trains provides the signal which is operable to start the self-test portion of the operating cycle of the controller 10. This signal is fed by means of a lead 102 to a first flip-flop 104. Another one of the pulse trains, i.e., the one which provides the CLEAR instruction, which was previously referred to hereinabove, is fed by lead 106 also to the flip-flop 104. As shown in FIG. 4, one of the outputs of flip-flop 104 is connected in circuit by circuit means 108 to test mode bus 109 and thereby to the logic processor 42. The other output of flip-flop 104 is connected in circuit relation to one input of a multi-input NAND 110. The output from NAND 110 is in turn fed therefrom to the fault bus 112 by circuit means 114.

A third of the four individual pulse trains which issues from instruction decoder 38, i.e., the one which provides the EXECUTE instruction, which also has been previously referred to hereinabove, is fed by lead 116 to a second flip-flop 118. One of the outputs from flip-flop 118 is connected in circuit by circuit means 120 to the test state bus 121 and thereby to one of the inputs of logic processor 42. The other output of flip-flop 118 is connected in circuit also with the aforedescribed NAND 110, the output of which as noted above is fed to fault bus 112. The remaining one of the four individual pulse trains which issue from instruction decoder 38 is fed by lead 122 and circuit means 124 to the NAND 110.

In the center left-hand portion of FIG. 4, there is depicted in block diagram form a representation of the cards of input modules 26, the cards of output modules 28 and the cards of timers 50. All of these cards are shown to be connected to the input bus 126. In turn, the input bus 126 is connected in circuit by lead 128 to one of the inputs of multi-input NAND 130, the output of which provides one of the inputs to the dual input NAND 132, with the output of the latter providing one of the inputs to NAND 110. Input bus 126 is also connected by means of lead 128 and circuit means 134 to one of the inputs of multi-input NAND 136, the output of which provides the other output to dual input NAND 132. In order to depict that the cards of input modules 26, the cards of output modules 28, and the cards of timers 50 are all connected to the fault bus 112 while maintaining clarity of illustration in FIG. 4 of the drawings, input bus 126 as well as representations in block diagram form of the cards of input modules 26, the cards of output modules 28, and the cards of timers 50 also are shown in the upper right-hand portion of FIG. 4 of the drawings. It has also been depicted therein in connection with these latter representations that the cards of input modules 26, the cards of output modules 28, and the cards of timers 50 are all connected by lead 138 to the test mode bus 109 and thereby to logic processor 42, the latter also being shown connected to output bus 140.

With reference further to FIG. 4 of the drawings, a block diagram representation of memory 12 is found illustrated in the lower left-hand portion of FIG. 4. Coded instructions from memory 12 representing either "NO INSTRUCTIONS" or "SPECIAL INSTRUCTIONS" are fed through conductors 142, 144 and 146 to a decoder 148 wherein the coded instructions are decoded. When so instructed, a pulse inhibit signal is fed by lead 150 to one of the inputs of multi-input NAND 110. In addition, as shown in FIG. 4, the output side of NAND 110 is also connected in circuit by lead 152 to a pulse stretcher 154, a relay 156, and ultimately a fault alarm means 158 operable to provide an indication of the detection of a fault.

Finally as depicted in FIG. 4, the self-test means 58 includes a card out test capability which is operable to provide automatic start lockout provisions, if any card is inadvertently left out of the controller 10. In this regard, controller 10 is provided with a card out bus 160 to which all of the cards in the controller 10 are suitably connected. The card out bus 160 in turn is connected by lead 162 to one of the inputs of NOR 164, the output of which is provided to a relay 166 which is operatively connected to a self-test fail or card out alarm/trip means 168. The latter is operable to provide a suitable indication in the event a card is left out of one of the racks. The other input of NOR 164 is connected through pulse stretcher 170 and lead 172 to circuit means 108.

Regarding the self-test capability of controller 10, as noted previously, this self-test capability falls into two basic categories. The first of these comprises a sequential test of input and output cards performed once per memory scan, utilizing the circuitry schematically shown in FIG. 4 of the drawings, which is based on a diagnostic test program contained in memory 12. Secondly, a continuous self-test is performed of the central process unit, which includes the memory 12, the memory address 14, instruction decoder 38 and logic processor 42, utilizing built-in test features on each individual card. In this latter connection, as described above, the controller 10 is provided with a card out test means which is operable to provide an alarm output when a card is sensed to have been left out, which could be used to prevent a turbine start. Insofar as concerns the self-testing of the memory 12, it is impractical to test the exact contents, i.e., program stored in the memory 12. However, a comprehensive check of basic memory addressing, decoding and readout function is performed. This is accomplished by inserting a special test word on each memory card and periodically interrogating that word to insure that the addressing and readout mechanisms of each memory card is properly functioning.

With respect to memory address 14, the basic elements of the latter are three counters (not shown) which convert the scan pulses into binary codes for sequentially addressing individual memory words. To test that these counters are operating properly, a test circuit, self-contained on the memory address card and operating independent of memory, tests for a periodic, i.e., once per scan, card address. Failure to make this address line on repetitive scans indicates that one or more of the counters is not working.

Instruction decoder 38 is tested by monitoring selected clock pulses used for scan and instruction control. Loss of these signals are detected to indicate a fault on the card. The logic processor 42 is self-tested by inserting a series of test instructions in memory 12 and monitoring the output of the logic processor 42 to insure that it produces the correct output solution.

The input cards and the output cards as well as input/output address decoding are also self-tested. Input/output address decoding is tested by inserting a special test address in memory 12 and detecting that this address is properly decoded once per memory scan. The input cards are self-tested by sequentially addressing all of the inputs on each card and monitoring the output of each card for receipt of conditions inserted at the card inputs. If the programmed output is not received the test card produces a failure indication which identifies the faulty card. The output cards are self-tested by sequentially addressing all of the outputs on each and monitoring the holding register for each output to insure that it receives a command programmed on to the output bus. If the programmed command is not received by a holding register the test card produces a failure indication which identifies the faulty card. This tests the output addressing and storage functions for each output.

Figure 5:
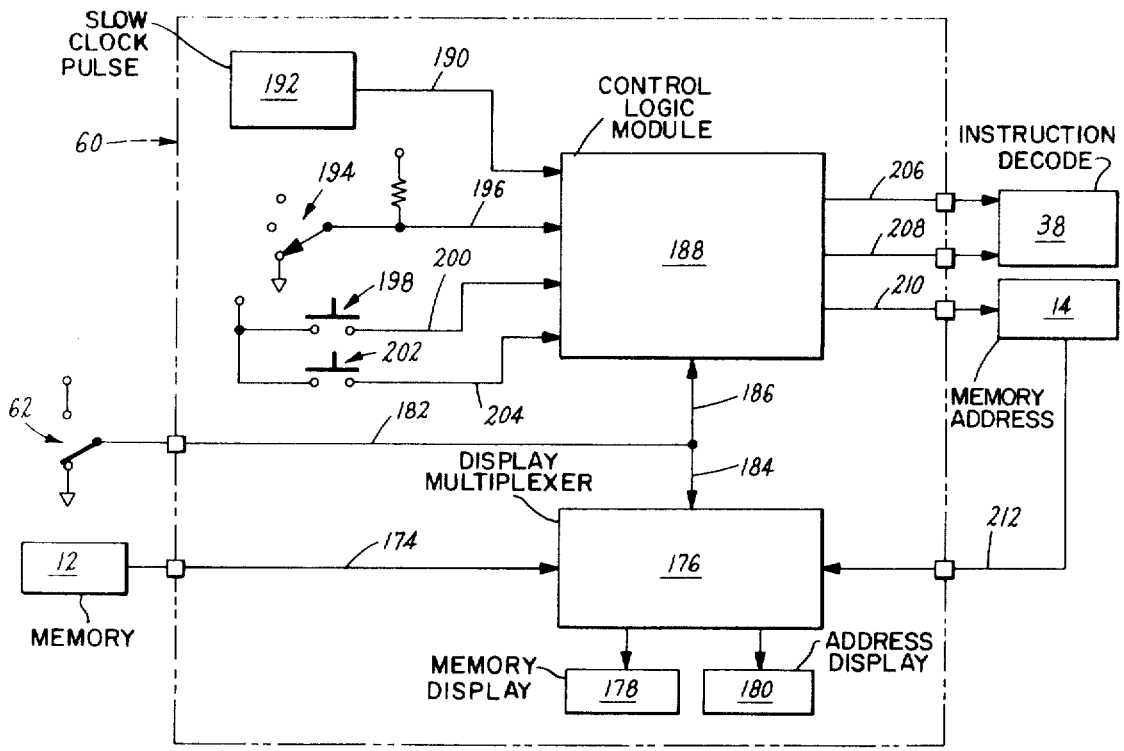
FIG. 5 is a block diagram of the manual built-in test module of a programmable industrial logic controller constructed in accordance with the present invention, illustrating the components embodied therein as well as the manner in which these components are interconnected relative to each other and to other components of the controller.

Referring now to FIG. 5 of the drawings, the manual built-in test means 60 of controller 10 is illustrated therein connected in circuit with the memory 12, test enabling switch 62, instruction decoder 38 and memory address 14. As is shown therein, memory 12 is connected by a lead 174 to a display multiplexer 176 which provides an output to memory content display means 178, and memory address 14 is connected by lead 212 to the same multiplexer 176 which provides an output to an address display means 180, as will be referred to more fully subsequently. Test enabling switch 62 which is movable between a first, i.e., TEST position and a second, i.e., RUN position is connected by leads 182 and 184 to the display multiplexer 176 and by leads 182 and 186 to a control logic module 188. The latter module 188 has inputs provided thereto from four sources. A slow clock pulse signal is adapted to be fed to the control logic module 188 by conductor 190 from a suitable slow clock pulse means 192. Three position selector switch 194 provides an input through lead 196 to the module 188, as will be described hereinafter. Also, a SCAN push button 198 is connected in circuit with module 188 by lead 200, and a RESET push button 202 is connected in circuit by lead 204 to the module 188. Three outputs are provided from control logic module 188. These include a slow clock pulse which is transmitted by lead 206 to the instruction decoder 38, a test enable signal which is transmitted by lead 208 also to the instruction decoder 38, and a memory reset signal which is supplied from module 188 by lead 210 to the memory address 14. Finally, as depicted in FIG. 5 of the drawings, an input is supplied to the display multiplexer 176 from the memory address 14 by means of lead 212.

Proceeding now with a description of the mode of operation of the circuitry illustrated in FIG. 5, the test enable switch 62 is adapted to be manually operated between a TEST position and a RUN position. The test enabling switch 62 provides a means of preventing the energization of unwanted outputs or an inadvertent start while testing. More particularly, when switch 62 is in the TEST position, a lockout is provided which kills the supply voltage to all of the output control devices, i.e., reed relays (not shown) to prevent outputs from being energized. In the RUN position, all manual test circuits, controls and indicators are deactivated. In accordance with the preferred embodiment of the invention, test enabling switch 62 is in the form of a key operated switch in order to provide a means of preventing the accidental operation thereof.

Considering further the mode of operation of built-in test means 60, the three position selector switch 194 allows the operator to control memory scan. In the NORMAL position of switch 194, memory 12 is scanned at a normal rate. In the SLOW position of the switch 194, the rate is reduced and a four digit visual display is activated on display means 180 which identifies the memory word being addressed. This permits the operator to scan memory 12 at a rate slow enough to follow the scan visually on the display means 180 until he reaches a word or group of words he wishes to test. The slow scan is controlled by a SCAN push button 198 allowing the operator to start or stop the scan of memory 12 at any part. Selector switch 194 also includes a STEP position which allows the operator to advance step-by-step through memory 12 with each push of the SCAN push button 198. Using display means 178 which displays memory contents, the operator may check any part of memory, word-by-word, for address and instruction content. The operator may also use this memory scan control to check logic by making inputs and slowly scanning through a selected part of memory 12 to check for operation. The display means 178 provides a four digit display with the first digit indicating the instruction and the remaining the input/output address. In a similar manner, display means 180 is adapted to provide a visual display of the identity of the memory word being addressed. The RESET push button 202 of built-in test means 60 permits resetting to the first word of memory 12 without scanning completely therethrough. Finally, as was noted previously hereinabove, the built-in test means 60 is deactivated when the test enabling switch 62 is in the RUN position.

Figure 6:
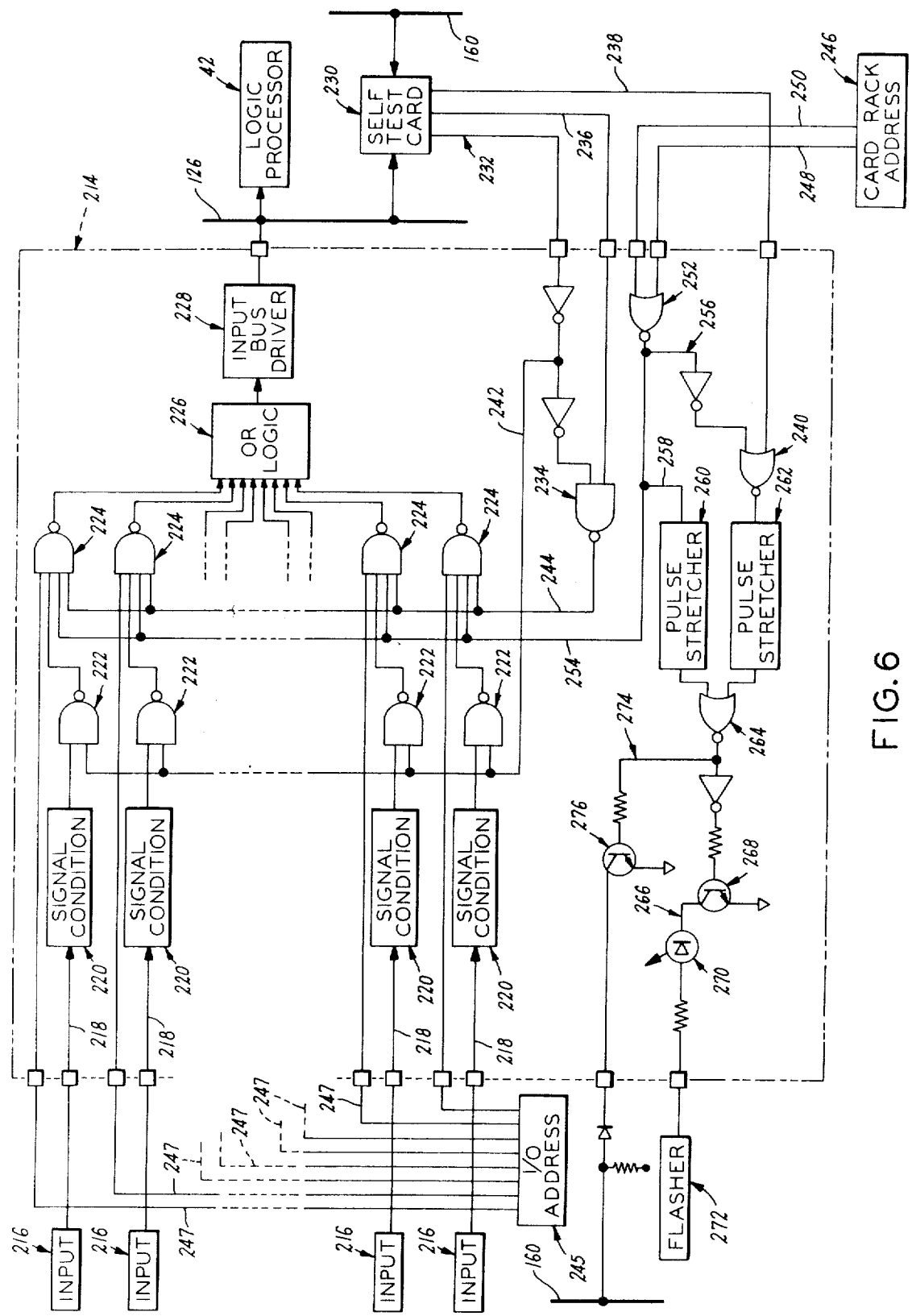
FIG. 6 is a schematic diagram of the input circuit module of a programmable industrial logic controller constructed in accordance with the present invention, illustrating the circuitry including the self-test logic and fault isolation portions thereof, and the manner in which the input module is connected in circuit relation with other portions of the controller.

A schematic diagram of the circuitry embodied on one of the input cards of the plurality thereof which is to be found in an input module 26 is depicted in FIG. 6 of the drawings, in that portion thereof which is contained within the dotted line enclosure 214. A total of eight inputs 216 are contained on each input card 214. However, inasmuch as the circuitry for each of the inputs 216 is the same, in the interest of clarity of illustration, only four of the eight inputs 216 which are contained on input card 214 have been shown in FIG. 6. Further, in connection with the following description of the circuitry depicted in FIG. 6, only one of the inputs 216 and its associated circuitry will be described hereinafter it being understood that the latter description is equally applicable to each of the other inputs 216 embodied on input card 214.

Regarding inputs 216, the signals received thereby may be provided from a variety of different types of sources such as control switches, limit switches, pressure switches, speed switches, etc. In accordance with the preferred embodiment of the invention, the signals provided from such switches are filtered and fed to optically coupled isolators (not shown). The isolators consist of light emitting diodes and transistors contained in one integral package and serve to translate input signals to 15 VDC logic level signals while providing a high degree of input isolation for noise immunity.

From the input 216, the signal is transmitted by lead 218 to a signal condition means 220 and therefrom to one of the inputs of a dual input NAND 222. The output of NAND 222 is provided as one of the inputs to multi-input NAND 224, with the output of the latter NAND being fed to an OR logic module 226. The output from OR logic module 226 is provided to the input bus driver 228, which in turn is connected to input bus 126. The input bus 126 is also shown in FIG. 6 as being connected to the logic processor 42 and self-test card 230, the latter card 230 in addition being illustrated as connected to card out bus 160. Three outputs are provided from self-test card 230. The first of these is transmitted by test mode bus means 232 to one of the inputs of dual input NAND 234. The second output is transmitted by test state bus 236 to the other input of NAND 234. The third output feeds a fault pulse by means of lead 238 to one of the inputs of NOR 240. Test mode bus means 232 is connected by lead 242 to each of the dual input NAND's 222 associated with each of the inputs 216 such as to provide the other input to the NAND's 222. The output of dual input NAND 234 is transmitted by lead 244 to one of the inputs of each of the multi-input NAND's 224 associated with the inputs 216. It is, of course, to be understood from FIG. 6 of the drawings that the input card 214 embodies eight NAND's 224, and that the output of each of the NAND's 224 is fed to the OR logic module 226. Also, it is noted that input/output address means 245 is connected in circuit relation by leads 247 to one of the inputs of each of the multi-input NAND's 224.

With regard further to FIG. 6, as illustrated therein, a card-rack address means 246 is provided having a pair of outputs which are connected by leads 248 and 250 to the dual inputs of NOR 252. The output from NOR 252 is connected by lead 254 to another input of each of the aforedescribed NAND's 224. In addition, the output of NOR 252 is connected by circuit means 256 to the other output of NOR 240, and by lead 258 to a first pulse stretcher 260. The output of NOR 240 is connected to a second pulse stretcher 262. Each of the pulse stretchers 260 and 262 in turn provides an input to the dual input NOR 264. The output from NOR 264 is connected by circuit means 266 to a transistor 268, a fault indicator light emitting diode 270, and a flasher 272. In addition, the output of NOR 264 is connected by circuit means 274 to transistor 276 and to card out bus 160. For purposes of clarity of illustration in the drawings, the card out bus 160 has been shown in the lower left-hand portion of FIG. 6 as well as the center right-hand portion of the latter figure.

In the event that the input card 214 is inadvertently omitted from the input module 26 of controller 10, an indication of this fact is provided by virtue of the circuit connections which exist between input card 214 and card out bus 160. Similarly, in the event that a fault is detected in input card 214, the fault indicator diode 270 and the flasher 272 are operative to cause the activation of a flashing fault light on input card 214 thereby to provide a visual indication and localization of the fault in controller 10 to the input card 214.

Figure 7:
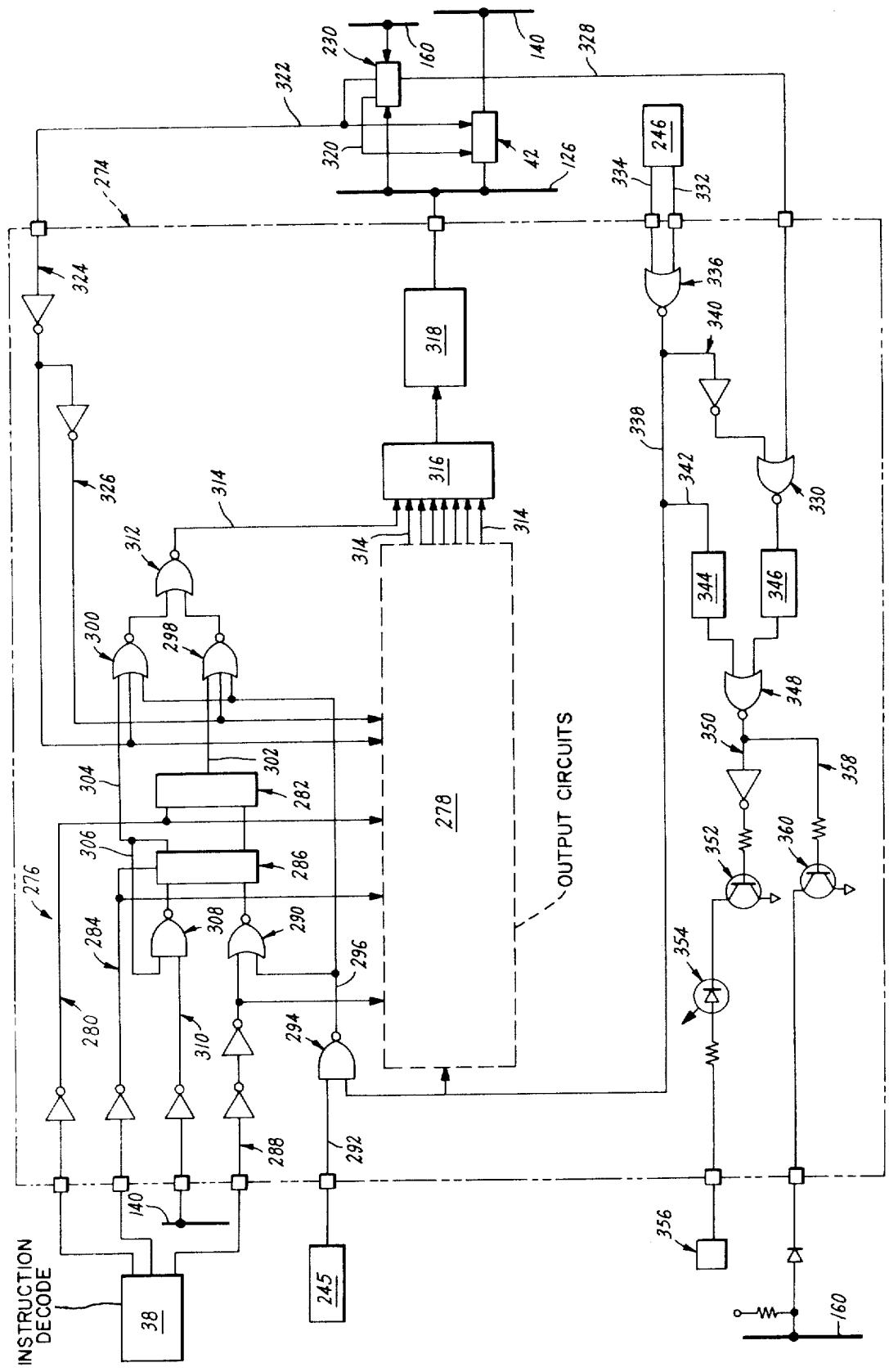
FIG. 7 is a schematic diagram of the output circuit module of a programmable industrial logic controller constructed in accordance with the present invention, illustrating the circuitry thereof as well as the manner in which the output circuit module is connected in circuit relation with other portions of the controller.

A schematic diagram of the circuitry embodied in one of the output cards of the plurality thereof which is to be found in an output module 28 is depicted in FIG. 7 of the drawings, in that portion thereof which is contained within the dotted line enclosure 274. A total of eight output circuits 276 are contained on each output card 274. However, inasmuch as the circuitry for each of the output circuits 276 is the same, in the interest of maintaining clarity of illustration in the drawings, only one output circuit 276 is shown in FIG. 7. The other seven output circuits 276 are depicted in block diagram form in the dotted line block which is designated by reference numeral 278. It is to be understood however, that the description as set forth hereinafter of the output circuit 276 which is shown in FIG. 7 is equally applicable to each of the other seven output circuits embodied on output card 274 which are merely schematically represented in FIG. 7 by the dotted line block 278.

Referring now to FIG. 7 of the drawings, instruction decoder 38 decodes the coded instructions fed thereto from memory 12, the latter not being depicted in FIG. 7. Three pulse signals are issued from instruction decoder 38. The first of these comprising an EXECUTE signal is transmitted by means of circuit means 280 to a first flip-flop 282 and to each of the other seven output circuits (not shown), i.e., as shown schematically in FIG. 7 by the extension of circuit means 280 to block 278. A second signal comprises a CLEAR signal and is transmitted by circuit means 284 to a second flip-flop 286 and to each of the other seven output cards (not shown) as schematically depicted in FIG. 7 by the extension of circuit means 284 to block 278. The final signal comprises a STORE signal and is transmitted by circuit means 288 to one of the inputs of a NOR 290 and also to each of the other seven output circuits (not shown) as symbolized in FIG. 7 by the extension of circuit means 288 to block 278.

Continuing with a description of the circuitry illustrated in FIG. 7 of the drawings, input/output address means 245 is connected by lead 292 to one of the inputs of dual input NAND 294. The output of NAND 294 is transmitted by lead 296 to the other input of NOR 290 and to one of the inputs of each of a pair of NOR's 298 and 300. The output of NOR 290 is transmitted to flip-flop 286 which in turn is connected to flip-flop 282. Flip-flop 282 is connected by lead 302 to one of the inputs of the aforementioned NOR 298, while flip-flop 286 is connected by lead 304 to one of the inputs of NOR 300 and by leads 304 and 306 to one of the inputs of dual input NAND 308. The other input of NAND 308 is connected by circuit means 310 to output bus 140, and the output of NAND 308 is connected in circuit relation with flip-flop 286. The outputs from the pair of NOR's 298 and 300 comprise the input to the NOR 312. The output of the latter NOR 312 is fed by lead 314 to the NOR logic module 316. It is to be understood that as schematically represented in FIG. 7, each of the other seven output circuits is connected by similar leads 314 in circuit with NOR logic module 316. The output from NOR logic module 316 is provided to the input bus driver 318, which in turn is connected to input bus 126. The input bus 126 is also shown in FIG. 7 as being connected to logic processor 42 and self-test card 230, the latter card 230 in addition being illustrated as connected to card out bus 160. Logic processor 42 is shown connected to output bus 140. Referring again to self-test card 230, three outputs are illustrated being provided therefrom. The first of these is transmitted by test state bus 320 to the logic processor 42. The second is transmitted by test mode bus 322 represented by the extension of circuit means 324 to block 278, to each of the other seven output circuits not specifically illustrated in the drawings. In addition, by virtue of the interconnection of circuit means 326 to circuit means 324, the output transmitted from self-test card 320 by test mode bus 322 is also provided to one of the inputs of NOR 298 and to each of the other seven output circuits schematically represented in FIG. 7 by block 278. The third output feeds a fault pulse by means of lead 328 to one of the inputs of NOR 330.

With regard further to FIG. 7, as illustrated therein, a card-rack address means 246 is provided having a pair of outputs which are connected by leads 332 and 334 to the dual inputs of NOR 336. The output from NOR 336 is connected by lead 338 to the other input of the aforedescribed dual input NAND 294 and to each of the other seven output circuits schematically depicted in FIG. 7 by block 278. In addition, the output of NOR 336 is connected by circuit means 340 to the other input of NOR 330, and by lead 342 to a first pulse stretcher 344. The output of NOR 330 is connected to a second pulse stretcher 346. Each of the pulse stretchers 344 and 346 in turn provides an input to the dual input NOR 348. The output from NOR 348 is connected by circuit means 350 to a transistor 352, a fault indicator light emitting diode 354, and a flasher 356. In addition, the output of NOR 348 is connected by circuit means 358 to transistor 360 and to card out bus 160. For purposes of maintaining clarity of illustration in FIG. 7, the card out bus 160 has been shown in the lower left-hand portion of FIG. 7 as well as the center right-hand portion of the latter figure, and the output bus 140 has been shown in both the upper left-hand portion and the center right-hand portion of FIG. 7.

With reference to FIG. 7 of the drawings, the manner in which an output card 274 stores and EXECUTES logic solutions will now be set forth. When the logic processor 42 has completed the solution to an output equation, as instructed by memory 12, the next memory word addresses the output and issues an instruction to STORE the solution in a holding register on the corresponding output card 274. When all output equations have been solved and their solutions stored in the corresponding holding registers, memory 12 issues an instruction to EXECUTE the stored solutions. This causes the information stored in the holding registers to be transferred to output registers which retain the solutions until the next memory scan is completed. The output registers directly control the output drivers through buffers either energizing or deenergizing loads. Following the EXECUTE command a CLEAR instruction is issued by memory 12 and decoded by instruction decoder 38, which resets the holding registers in preparation for receiving updated solutions from the next memory scan.

The output address portion of input/output address means 245 consists of one of eight output selects. When a particular output is addressed a gate controlling the store pulse is enabled permitting the store pulse, generated by the instruction decoder 38 in response to an instruction received thereby by memory 12, to strobe the holding register. This causes the holding register to store the output solution present on the output bus 140. When all output solutions have been stored in their respective holding registers, memory 12 causes the instruction decoder 38 to output first an EXECUTE pulse, which causes the output register to store the content of the holding register, and then a CLEAR pulse, which resets the holding register.

Since outputs may also be treated as inputs in the logic equation for another output, addressing an output also feeds the status of the output register onto the input bus 126 making it available for interrogation by the logic processor 42. Since the addressing of an output for the purpose of examining its state is not accompanied by a STORE instruction, the contents of the holding and output registers are not affected.

In the event that the output card 274 is inadvertently omitted from the output module 28 of controller 10, an indication of this fact is provided by virtue of the circuit connections which exist between output card 274 and card output bus 160. Similarly, in the event that a fault is detected in output card 274, the fault indicator diode 354 and the flasher 356 are operative to cause the activation of a flashing fault light on output card 274 thereby to provide a visual indication and localization of the fault in controller 10 to the output card 274.

Figure 8:
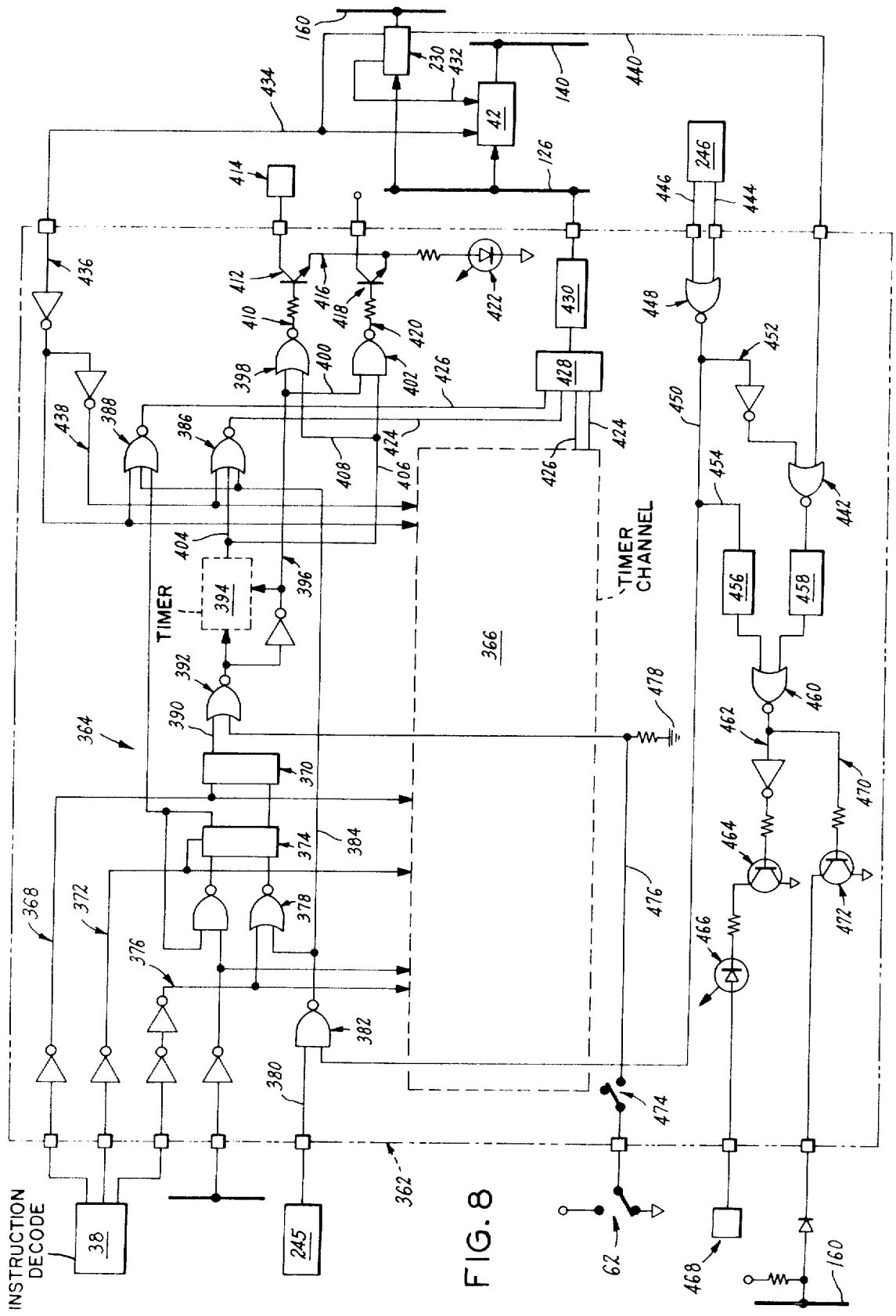
FIG. 8 is a schematic circuit diagram of the timer module of a programmable industrial logic controller constructed in accordance with the present invention, illustrating the circuitry thereof and the manner in which the timer module is connected in circuit relation with other components of the controller.

A schematic diagram of the circuitry embodied in one of the timer cards of the plurality thereof which is to be found in a timer 50 is depicted in FIG. 8 of the drawings, in that portion thereof which is contained within the dotted line enclosure 362. In the interest of clarity of illustration, the circuitry for only one timer channel 364 has been specifically illustrated in FIG. 8, with a second identical timer channel being represented therein in block diagram form by the dotted line block 366. However, it is to be understood that the description as set forth hereinafter of the timer channel 364 which is shown in FIG. 8 is equally applicable to the other timer channel embodied on timer card 362 which is merely schematically represented in FIG. 8 by the dotted line block 366.

Referring now to FIG. 8 of the drawings, instruction decoder 38 decodes the coded instructions fed thereto from memory 12, the latter not being depicted in FIG. 8. Three pulse signals are issued from instruction decoder 38. The first of these comprising an EXECUTE signal is transmitted by means of circuit means 368 to a first flip-flop 370 and to the other timer channel (not shown), i.e., as shown schematically in FIG. 8 by the extension of circuit means 368 to block 366. The second signal comprises a CLEAR signal and is transmitted by circuit means 372 to a second flip-flop 374 and to the other timer channel (not shown) as schematically depicted in FIG. 8 by the extension of circuit means 372 to block 366. The final signal comprises a STORE signal and is transmitted by circuit means 376 to one of the inputs of NOR 378 and also to the other timer channel (not shown) as symbolized in FIG. 8 by the extension of circuit means 376 to block 366.

Continuing now with a description of the circuitry illustrated in FIG. 8 of the drawings, input/output address means 245 is connected by lead 380 to one of the inputs of dual input NAND 382. The output of NAND 382 is transmitted by lead 384 to the other input of NOR 378 and to one of the inputs of each of a pair of NOR's 386 and 388. The output of NOR 378 is transmitted to flip-flop 374 which in turn is connected to flip-flop 370. Flip-flop 370 is connected by lead 390 to one of the inputs of NOR 392. The output from NOR 392 is fed to a timer, schematically illustrated in FIG. 8 by the dotted line block 394. In addition, the output side of NOR 392 is connected by circuit means 396 to one of the inputs of the NOR 398 and by lead 400 to one of the inputs of dual input NAND 402. Timer 394 is connected in circuit with one of the inputs of NOR 386 by lead 404, and with the other of the inputs of dual input NAND 402 by lead 406. Also, timer 394 is connected by lead 406 and lead 408 to the other input of NOR 398. The output side of NOR 398 is connected in circuit relation by circuit means 410 to the base of transistor 412. The collector of transistor 412 is connected in circuit with flasher 414, and the emitter of transistor 412 is connected in circuit by circuit means 416 to the emitter of transistor 418 which is connected in circuit relation to the output side of NAND 402 by circuit means 420. As depicted in FIG. 8, the emitters of transistors 412 and 418 are connected in circuit by circuit means 416 to a timer status indicator light emitting diode 422.

With further regard to FIG. 8 of the drawings, the outputs from the pair of NOR's 386 and 388 are fed by lead 424 and 426 to a NOR logic module 428. It is to be understood that as schematically represented in FIG. 8, the second timer channel 366 is connected by similar leads 424 and 426 in circuit with OR logic module 428. The output from OR logic module 428 is provided to the input bus driver 430, which in turn is connected to input bus 126. The input bus 126 is also shown in FIG. 8 as being connected to logic processor 42 and self-test card 230, the latter card 230 in addition being illustrated as connected to card out bus 160. Logic processor 42 is shown connected to output bus 140. Referring again to self-test card 230, three outputs are illustrated being provided therefrom. The first of these is transmitted by test state bus 432 to the logic processor 42. The second is transmitted by test mode bus 434 to logic processor 42 and to circuit means 436 which in turn is connected to one of the inputs of NOR 388, and as schematically represented by the extension of circuit means 436 to block 366, to the second timer channel the components of which are not specifically illustrated in the drawings. In addition, by virtue of the interconnection of circuit means 438 to circuit means 436, the output transmitted from self-test card 230 by test mode bus 434 is also provided to one of the inputs of NOR 386 and to the second timer channel schematically represented in FIG. 8 by block 366. The third output feeds a fault pulse by means of lead 440 to one of the inputs of NOR 442.

With further reference to FIG. 8, as illustrated therein, a card/rack address means 246 is provided having a pair of outputs which are connected by leads 444 and 446 to the dual inputs of NOR 448. The output from NOR 448 is connected by lead 450 to the other input of the aforedescribed dual input NAND 382. In addition, the output of NOR 448 is connected by circuit means 452 to the other input of NOR 442, and by lead 454 to a first pulse stretcher 456. The output of NOR 442 is connected to a second pulse stretcher 458. Each of the pulse stretchers 456 and 458 in turn provides an input to the dual input NOR 460. The output from NOR 460 is connected by circuit means 462 to a transistor 464, a fault indicator light emitting diode 466, and a flasher 468. Also, the output of NOR 460 is connected by circuit means 470 to transistor 472 and to card out bus 160. For purposes of maintaining clarity of illustration in FIG. 8, the card out bus 160 has been shown in the lower left-hand portion of FIG. 8 as well as the center right-hand portion of the latter figure, and the output bus 140 has been shown in both the upper left-hand portion and the center right-hand portion of FIG. 8. Finally, as illustrated in FIG. 8 of the drawings, the timer card 364 has connected in circuit therewith a test enable switch 62 which is connected in turn with a built-in test switch 474. The switches 62 and 474 are connected in circuit by lead 476 to the other input of NOR 392 and to ground 478.

Insofar as concerns the mode of operation of timer 50 in general and a timer card 364, in particular, time delays are provided by programming the timer equation in memory 12, solving the timer equation the same as any output equation, storing the solution on a timer card 364 and using the output therefrom similar to using the output of the output card 274, to energize and de-energize the timer 50. To utilize the timer 50 in another output equation the timer 50 is simply addressed by memory 12 to interrogate its state.

In accordance with the preferred embodiment of the present invention, the timers are in the form of plug-in modules packaged two to a card. Each timer is provided with a light 422 which indicates timer status. These lights are uniquely employed to indicate the three timer states, i.e., ON, OFF and TIMING. When the timer output is off, i.e, dropped-out, the light is out. When the timer is ON, i.e., pulled-in, the light is ON, and when the timer is in the process of timing either during pull-in or dropout the light will pulse. The pulse rate is once per second to provide a means of measuring the time delay without test equipment by counting light pulses, i.e., one pulse equals one second. This permits a visual time check which is sufficient for fault detection, and for longer delays, can be used for calibrations.

A built-in test switch 474 is provided on each timer module. When enabled through an external test input signal from switch 62, switch 474 permits the timer to be operated manually to check timer operation and timer settings. The built-in test enable feature is so implemented that the manual timer control has no effect during on line control conditions. Timers are provided with time delay on energization and time delay on de-energization capability, and cover a timing range of 0.5 second to 90 minutes.

In the event that the timer card 364 is inadvertently omitted from the controller 10, an indication of this fact is provided by virtue of the circuit connections which exist between timer card 364 and card out bus 160. Similarly, in the event that a fault is detected in timer card 364, the fault indicator diode 466 and the flasher 468 are operative to cause the actuation of a flashing fault light on timer card 364 thereby to provide a visual indication and localization of the fault in controller 10 to the timer card 364.

Turning now to a consideration of some of the physical characteristics of a programmable industrial logic controller constructed in accord with the preferred form thereof illustrated in the drawings and described hereinabove, standard 19 inch rack and panel equipment is utilized in the construction thereof. Printed circuit cards are housed 16 cards per rack mounted on 1 inch centers. One full rack is consumed by the central process unit which contains the memory address 14, address and instruction decoders 20 and 38, respectively, logic processor 42, self-test means 58 and built-in test means 60 as well as provision for 8K of memory. Additional racks are added for input/output capability, each rack accommodating 128 inputs and/or outputs. Printed circuit cards are constructed of 1/16 inch thick glass epoxy material. Components are flow soldered in place and receive a protective conformal coat for moisture resistance. Each card is provided with an aluminum bracket for mounting of panel indicator lights, i.e., light emitting diodes.

Electrical connections internal to the controller 10 consist of three basic families of connection levels. Printed circuit cards inset into printed circuit connectors. Connections which join each of these module connectors together are accomplished with printed circuit wiring on ⅛ inch thick "mother board." Each of the aforementioned 19 inch racks contain its own mother board to which are soldered 18 of the printed circuit connectors. With 16 of the connectors accepting appropriate circuit cards, the remaining ones form part of the second level of interconnection.

With the exception of the driver, i.e., output power switch racks, all other racks must connect to the central processing unit and memory rack. This busing is accomplished by means of a molded flat 36 conductor, 24 gauge stranded wire cable. The bus starts with plugging one end of such a flat cable into the central process unit rack, and the other end into the second rack just below. A second cable of like design plugs into the eighteenth connector of the second rack and the seventeenth connector of the third rack, etc.

The third family of interconnections is between installation connectors and the input/output circuit racks. This level of wiring consists of 18 gauge stranded, single conductor wiring terminated at the rack end to terminal blocks, soldered to the respective mother boards. The terminal blocks provide a very versatile connection system for this level of wiring since field changes, and modifications of input and output requirements inherently alter these connections. If desired, however, pigtail leads can be provided in place of terminal blocks.

Extensive noise suppression and transient protection measures are integrated into the solid state logic however, as described hereinbelow for withstanding the inherently transient nature of the application. These provisions provide the assurance required for eliminating shielded wire. A representative size controller 10 providing 512 input/output capacity with 64 timers consists of eight 19 inch racks of equipment occupying a volume of approximately 20 × 12 × 56 inches, with racks stacked vertically and weighing approximately 150 pounds.

The logic circuitry utilized within the controller 10 is powered from a 15 VDC power source. Memory elements and light emitting diodes are powered from 5 VDC sources. The controller 10 is capable of being provided with power supplies which will operate from both AC and DC sources. Estimated power consumption for a 512 input/output size controller is 500 watts with a unit operating at full power, i.e., 75 percent of input and output energized. It should be noted that approximately one-third of the power at full load is intentional loading of input switches and devices to ensure obtaining reliable input signals, thereby eliminating the need for input switching devices that must provide reliable inputs at low requirements, i.e., no dry circuit requirements imposed on input devices.

The standard ambient temperature range of the controller is 0° to 60°C, although this range can be extended. The use of C-MOS integrated circuits, described below, with its very low power dissipation makes forced air cooling unnecessary.

As noted above, the controller 10 is provided with a read only memory. Although a number of read only memory technologies exist, a semiconductor memory has been chosen for employment in the controller 10 in accord with the preferred embodiment of the invention because of the advantages afforded thereby. In this connection, the semiconductor memory by being electrically programmable, i.e., no wiring changes required offers an ease of programming in the field. With regard to reliability, all address decoding and buffering is performed within the memory thereby requiring less complexity of the input/output interfaces. Further, semiconductor memories are encased in hermetically sealed packages making them impervious to moisture, contamination, etc., and operate over a wider temperature range than other types. Also, semiconductor memories have superior resistance to shock and vibration damage. The outputs of semiconductor memories are continuous rather than pulsed such as in core and plated wiring memories thereby contributing to better noise immunity. Also, bits cannot be lost due to power transients. Another advantage of semiconductor memories is that semiconductors require significantly less power and simpler power supplies than other types, contributing to a low standby drain on the battery system.

A high noise immunity type of logic is a basic prerequisite of the programmable industrial logic controller 10. There are two types of high noise immunity logic available which are generally referred to as HNIL and C-MOS logic. THE HNIL logic, wherein HNIL stands for High Noise Immunity Logic, is similar to diode transistor logic but with a considerably larger input threshold characteristic added by the use of reversed biased base-emitter junction on the inputs. These junctions act like Zener diodes raising the input threshold level to approximately 7.5 VDC.

C-MOS logic, herein C-MOS stands for complimentary metal-oxide semiconductor, employs two basic types of metal-oxide transistors referred to as N-channel and P-channel transistors. The high noise immunity of a C-MOS device lies in its inherent high voltage switching threshold typically 50 percent of +V, thus providing a voltage threshold of 7.5 VDC when operated with a 15 VDC supply. C-MOS logic is also a "slow" logic family which further contributes to noise immunity.

C-MOS logic and HNIL logic offer about the same noise immunity advantages, high threshold voltage and low speed. However, C-MOS logic was selected for employment in the preferred form of the programmable industrial logic controller 10 because of the other significant advantages possessed by C-MOS logic as compared to HNIL logic. In this connection, C-MOS logic requires almost negligible power, being the lowest power logic available. This is particularly important where standby power drain is important, such as in turbine control applications wherein there is a requirement to provide a black start capability. Low power also means less heat rise in the controller 10 and more reliable operation. The low power required and the wide operating voltage range, i.e., three to 15 VDC, of C-MOS logic contributes to increased reliability and lower cost by requiring simpler and more reliable power supplies operating at low temperatures. In addition, the HNIL logic family is relatively limited in the range of devices offered. On the other hand, the C-MOS logic family utilizing the capability of large scale MOS circuits offers the widest variety of individual gating functions and larger scale arrays than any other logic family. This considerably aids in optimization and minimization of circuits for lower cost and improved reliability.

Programming of the programmable industrial logic controller 10 is accomplished through the use of a simple set of instructions and may be done directly from logic statements, equations, ladder diagrams or logic diagrams. The programming language is expressed in terms that relate directly to actual input and output conditions and the simple logic operations being performed on them. Programming can be accomplished at the customer's factory or in the field without the use of computers, and with no knowledge of computer programming language. Only six instructions are required. Each instruction is assigned a digit. This digit combined with three additional digits which identify the input or output being addressed, make up a complete memory word. The programmer may therefore specify a memory word by writing a four digit number, the first digit representing the instruction or operation and the following three digits identifying the input or output. This four digit word actually is the equivalent of the twelve binary bits which form the memory word. In addition to the six basic programming instructions, a number of special instructions may also be provided. The latter instructions are used less frequently and require a complete memory word to specify them. The special instructions cause the remaining three digits from an input/output address to be converted to the desired special instructions.

Although only one embodiment of a programmable industrial logic controller constructed in accordance with the present invention has been shown in the drawings and described hereinabove, it is to be understood that modifications in the construction thereof may be made thereto by those skilled in the art without departing from the essence of the invention. In this connection, some of the modifications which can be made in the controller 10 have been alluded to hereinabove while others will become readily apparent to those skilled in the art when exposed to the present description and illustration of the construction of the controller 10.

Thus, it can be seen that the present invention provides a novel and improved programmable industrial logic controller which is adapted for use in providing automatic control of gas turbine engines and associated equipment used with them in industrial applications. The programmable industrial logic controller of the present invention embodies automatic self-test means operable for automatically performing a sequential test of input and output cards once per memory scan based on a diagnostic test program contained in the memory of the controller. Moreover, in accord with the present invention, a programmable industrial logic controller has been provided which includes a manual built-in test means which provides a means of displaying memory contents via a set of manual control switches, and wherein the switches are interlocked with output circuits to prevent accidental and undesired energization of output loads during tests. The programmable industrial logic controller of the present invention is provided with fault detection means which is operative to cause the actuation of a flashing fault light on a given component thereby to provide a visual indication and localization of a fault in the controller to the given component. Further, the subject programmable industrial logic controller embodies timers which include light emitting diodes which are capable of indicating which of the timers has been energized, whether it is in fact timing, i.e., by the blanking action thereof and when it is OFF. Also, the programmable industrial logic controller of the present invention employs random programming whereby all standard logic conditions can be preprogrammed into the memory modules and added customer changes can be simply programmed at the end of the program when the logic is determined thereby obviating any need to completely rejuggle the memory program to fit the new logic into the proper place. Finally, there has been provided in accord with the present invention a programmable industrial logic controller which utilizes nine bit memory thereby providing 512 possible input/output addresses but which is also capable of functioning to provide an additional 512 output addresses.

Having thus described the invention, we claim:

1. A programmable controller, for accomplishing the sequencing operations and other related control tasks performed by a logic control system of the type adapted for controlling machine and process equipment, comprising:

a. input means operable to receive inputs supplied to the controller corresponding to the existing condition of a plurality of parameters of the equipment being controlled;

b. memory means having a pre-established set of instructions describing the control system requirements for the equipment being controlled;

c. control logic means connected in electrical circuit relation with said input means and said memory means, said control logic means operating to scan inputs received by said input means in response to instructions received from said memory means and to compare the status of the scanned inputs to the control system requirements stored in said memory means to generate outputs for controlling the operation of the equipment;

d. output means connected in electrical circuit relation with said control logic means for receiving therefrom said outputs and for supplying said outputs to the equipment being controlled; and e. automatic on-line self-test means self-contained in the controller and connected in electrical circuit relation with said input means, said memory means, said control logic means and said output means, said automatic on-line self-test means in response to instructions provided thereto from said memory means performing continually while the controller is in an on-line operating state a self-test of the controller to determine whether the controller is functioning properly.

2. A programmable controller as set forth in claim 1 wherein said input means comprises an input module including a plurality of input cards each operable to translate input signals supplied to the controller to logic level signals while providing isolation from electrical noise derived from external sources and each having a separate input light operable to indicate the ON and OFF status of the input card.

3. A programmable controller as set forth in claim 1 wherein said output means comprises an output module including a plurality of output cards operable for storing logic solutions thereon and for executing the stored solutions when all output equations have been solved whereby to provide outputs therefrom corresponding to the stored solutions thereon thereby to control the energizing and deenergizing of loads in accordance therewith.

4. A programmable controller as set forth in claim 1 wherein said memory means comprises a plurality of integrated circuit programmable read only semiconductor memory devices each containing 1,024 bits of memory storage organized as 256 words of 4 bits each.

5. A programmable controller as set forth in claim 1 further comprising built-in test means including switch means operable for displaying memory contents and interlocked with said output means to prevent accidental and undesired energization of said outputs from the controller during operation of said switch means.

6. A programmable controller as set forth in claim 1 further comprising timing means operable to provide adjustable time delays in response to programmed memory instructions and including light means having three operating states consisting of a lighted state when said timing means is ON, an unlighted state when said timing means is OFF, and a flashing state when said timing means is timing, and switch means permitting manual operation of said timing means to check the operation and setting thereof.

7. A logic control system, for providing automatic control of gas turbines and associated equipment such as compressors, generators, etc. used with them in industrial applications by accomplishing the multitude of functions required to automatically start the turbine system, monitor its proper acceleration and normal running, automatically sequence normal shutdown operation and provide automatic alarm and emergency control if malfunctions occur, comprising:
  a. input means receiving inputs from signal devices provided in the turbine system indicating the existing condition of the parameters of operation of the turbine engine and its associated equipment;
  b. output means providing outputs from the logic control system to the turbine system for controlling the operation of the turbine engine and its associated equipment;
  c. interrogating means connected in circuit relation with said input means and said output means for interrogating the status of the inputs of said input means and the outputs of said output means;
  d. programmable memory means having stored therein a series of digitally coded instructions representing the solution to a set of equations describing the control system requirements for the turbine system;
  e. a central process unit connected in circuit relation with said interrogating means and said programmable memory means for receiving the status of selected inputs from said input means and selected outputs from said output means and for performing logic operations thereon in response to instructions received from said programmable memory means whereby the outputs provided from said output means for controlling the operation of the turbine system are determined as a function of the inputs received by said input means from the turbine system; and
  f. automatic on-line self-test means self-contained in the control system and connected in electrical circuit relation with said input means, said output means, said interrogating means, said programmable memory means and said central process unit, said automatic on-line self-test means in response to instructions provided thereto from said memory means performing continually while the control system is in an on-line operating state a self-test of the control system to determine whether the control system is functioning properly.

8. A logic control system as set forth in claim 7 wherein said central process unit includes memory address means for addressing a particular location in said programmable memory means for extracting a desired instruction therefrom.

9. A logic control system as set forth in claim 7 wherein said central process unit includes an instruction decoding means for decoding and converting instructions received from said programmable memory means into electrical signals which control the operation of the control circuits employed in solving the equations programmed in said programmable memory means.

10. A logic control system as set forth in claim 7 wherein said central process unit includes a logic process means for performing AND and OR logic operations on the inputs of said input means and the outputs of said output means in response to instructions programmed into said programmable memory means.

11. A logic control system as set forth in claim 7 wherein said self-test means includes means for providing a visual fault indication of the existence of a fault in the logic control system.

12. A logic control system as set forth in claim 7 further comprising a built-in test means including switch means operable for displaying contents of said programmable memory means.

13. A logic control system as set forth in claim 7 further comprising a timer means operable to provide adjustable time delays in response to instructions programmed into said programmable memory means and including light means for indicating the ON and OFF status of said timer means and switch means permitting manual operation of said timer means to check the operation and settings thereof.

14. A logic control system for controlling the operation of a turbine system comprising:
  a. input means receiving inputs from signal devices provided in the turbine system indicating the existing conditions of a plurality of the parameters of operation of the turbine system;
  b. output means providing outputs from the logic control system to the turbine system for controlling the operation of the latter;
  c. memory means having stored therein a series of instructions describing the control system requirements of the turbine system;

d. logic processing means connected in circuit relation with said input means, said output means and said memory means for performing logic operations on the inputs received by said input means in response to instructions programmed in said memory means to determine the outputs provided from said output means for controlling the operation of the turbine system as a function of the inputs received by said input means from the turbine system; and e. self-test means for periodically performing a self-test of the logic control system in response to a series of instructions stored in said memory means.

15. A logic control system as set forth in claim 14 wherein said self-test means further includes means for providing a visual fault indication of the existence of a fault in the logic control system.

16. A logic control system for controlling the operation of a turbine system comprising:

a. input means receiving inputs from signal devices provided in the turbine system indicating the existing condition of a plurality of the parameters of operation of the turbine system;

b. output means providing outputs from the logic control system to the turbine system for controlling the operation of the latter;

c. memory means having stored therein a series of instructions describing the control system requirements of the turbine system;

d. logic processing means connected in circuit relation with said input means, said output means, and said memory means for performing logic operations on the inputs received by said input means in response to instructions programmed in said memory means to determine the outputs provided from said output means for controlling the operation of the turbine system as a function of the inputs received by said input means from the turbine system; and e. timer means operable to provide adjustable time delays in response to instructions programmed into said memory means and including light means having three operating states consisting of a lighted state when said timer means is ON, an unlighted state when said timer means is OFF and a flashing state when said timer means is timing, and switch means permitting manual operation of said timer means to check the operation and settings thereof.

17. A logic control system for controlling the operation of a turbine system comprising:

a. input means receiving inputs from signal devices provided in the turbine system indicating the existing condition of a plurality of the parameters of operation of the turbine system;

b. output means providing outputs from the logic control system to the turbine system for controlling the operation of the latter;

c. memory means having stored therein a series of instructions describing the control system requirements of the turbine system;

d. logic processing means connected in circuit relation with said input means, said output means, and said memory means for performing logic operations on the inputs received by said input means in response to instructions programmed in said memory means to determine the outputs provided from said output means for controlling the operation of the turbine system as a function of the inputs received by said input means from the turbine system; and e. built-in test means including manually operable means for controlling the rate at which said memory means is scanned and for visually displaying the contents of said memory means.

18. A logic control system for controlling the operation of a turbine system comprising:

a. input means receiving inputs from signal devices provided in the turbine system indicating the existing condition of a plurality of the parameters of operation of the turbine system;

b. output means providing outputs from the logic control system to the turbine system for controlling the operation of the latter;

c. memory means including an integrated circuit programmable read only semiconductor memory capable of being programmed by random programming and having stored therein a series of instructions describing the control system requirements of the turbine system, said memory means including a plurality of memory words with each of said plurality of memory words being composed of 12 bits with 3 of said 12 bits defining the instruction and operation to be performed and the remaining 9 of said 12 bits defining a particular one of the inputs and outputs to be addressed and wherein said 9 bits provide a capability of addressing 512 inputs and outputs, said memory means further including circuit means operable for addressing an additional 512 outputs with said nine bits in response to an instruction from one of said 3 bits of the 12 bit word; and d. logic processing means connected in circuit relation with said input means, said output means, and said memory means for performing logic operations on the inputs received by said input means in response to instructions programmed in said memory means to determine the outputs provided from said output means for controlling the operation of the turbine system as a function of the inputs received by said input means from the turbine system, and including means operable to permit changes to be made in said series of instructions stored in said memory means simply by erasing the unwanted instruction and programming a new instruction as a substitute therefor at the end of said memory means.

* * * * *